United States Patent
Yamada

(10) Patent No.: US 8,712,576 B2
(45) Date of Patent: Apr. 29, 2014

(54) CONTROLLER FOR MACHINE TOOL AND FIVE-AXIS SIMULTANEOUS CONTROL MACHINE TOOL CONTROLLED THEREBY

(75) Inventor: Yoshihiko Yamada, Anjo (JP)

(73) Assignee: JTEKT Corporation, Osaka-shi (JP)

( * ) Notice: Subject to any disclaimer, the term of this patent is extended or adjusted under 35 U.S.C. 154(b) by 435 days.

(21) Appl. No.: 12/768,123

(22) Filed: Apr. 27, 2010

(65) Prior Publication Data

US 2010/0286813 A1 Nov. 11, 2010

(30) Foreign Application Priority Data

May 7, 2009 (JP) ................................ 2009-112572

(51) Int. Cl.
*G06F 19/00* (2011.01)
(52) U.S. Cl.
USPC .......................................... 700/188; 700/174
(58) Field of Classification Search
USPC ......... 700/174, 175, 178, 186–193, 254, 255, 700/302
See application file for complete search history.

(56) References Cited

U.S. PATENT DOCUMENTS

| | | | |
|---|---|---|---|
| 5,018,911 A * | 5/1991 | Stursberg ........................ | 408/13 |
| 5,027,680 A * | 7/1991 | Kohari et al. .................. | 82/1.11 |
| 5,740,327 A | 4/1998 | Funaya | |
| 7,969,111 B2 * | 6/2011 | Otsuki et al. ................... | 318/572 |
| 2002/0084763 A1 * | 7/2002 | Shibukawa et al. ........... | 318/569 |
| 2005/0035734 A1 | 2/2005 | Haunerdinger et al. | |
| 2010/0244762 A1 * | 9/2010 | Mori et al. ..................... | 318/632 |

FOREIGN PATENT DOCUMENTS

| | | |
|---|---|---|
| EP | 1 993 013 A2 | 11/2008 |
| JP | 2001-154718 | 6/2001 |
| JP | 2008-90734 | 4/2008 |

OTHER PUBLICATIONS

U.S. Appl. No. 12/853,614, filed Sep. 10, 2010, Yamada, et al.
Extended European Search Report issued Mar. 27, 2012, in Patent Application No. 10161823.9.

* cited by examiner

*Primary Examiner* — Carlos Ortiz Rodriguez
(74) *Attorney, Agent, or Firm* — Oblon, Spivak, McClelland, Maier & Neustadt, L.L.P.

(57) ABSTRACT

A controller for a machine tool and a five axis simultaneous control machine tool which can improve machining accuracy in controlling a pivoting axis of the machine tool. The controller including an allowable position error setting member setting an allowable position error between a commanded machining position and an actual machining position; a velocity control parameter deciding member deciding a velocity control parameter of the pivoting axes of the A-axis and the B-axis in accordance with the allowable position error being set and a distance of said actual machining position from the pivoting axes; and a controlling member controlling a velocity of the pivoting axes based on the velocity control parameter.

20 Claims, 5 Drawing Sheets

CONTROLLER FOR MACHINE TOOL AND FIVE-AXIS SIMULTANEOUS CONTROL MACHINE TOOL CONTROLLED THEREBY

INCORPORATION BY REFERENCE

The present application claims priority under 35 U.S.C. §119 to Japanese Patent Application No. 2009-112572, filed on May 7, 2009. The content of this application is incorporated herein by reference in the entirety.

BACKGROUND OF THE INVENTION

1. Field of the Invention

The present invention relates to a controller for a machine tool and a five-axis simultaneous control machine tool controlled thereby. The five-axis simultaneous control machine tool includes at least a linear axis and a rotational axis.

2. Description of the Prior Art

It is disclosed in the laid-open patent publication of Tokkai 2001-154718 that a controller controls to reduce in-feed velocity of a linear axis in order to prevent large load to a tool where there is a large rate L/D of a tool length L relative to a tool diameter D.

Nowadays, a five-axis simultaneous control machine tool is generally improved to higher specifications as shown in the laid-open patent publication of Tokkai 2008-090734.

For example, there is known the five-axis simultaneous control machine tool having a rotating axis pivoting a supporting member that supports an endmill as a tool. There is happened that an actual nose position of the tool is displaced from a commanded position based on an error of controlling the rotational axis where the machining is performed during the rotation of the supporting member. This phenomena creates a machining error to reduce machining accuracy, especially this is happened in the machine tool having a longer distance of the tool.

SUMMARY OF THE INVENTION

In view of the previously mentioned circumstances, it is an object of the present invention to provide a controller for a machine tool and a five axis simultaneous control machine tool controlled thereby which can improve machining accuracy in controlling a pivoting axis of the machine tool.

In order to achieve the above and other objects, one aspect of the present invention provides a controller for a machine tool comprising an allowable position error setting member setting an allowable position error between a commanded machining position and an actual machining position, a velocity control parameter deciding member deciding a velocity control parameter of a pivoting axis in accordance with the allowable position error being set and a distance of the actual machining position from the pivoting axis, and a controlling member controlling a velocity of the pivoting axis based on the velocity control parameter.

The controller for the machine tool according to the first aspect of the present invention decides the velocity control parameter based on "the allowable position error" and "the distance of the actual machining position from the pivoting axis". In this case there exist the angular errors of the pivoting axis in controlling the pivoting axis. The angular error is a difference between the commanded angle and the actual angle. Even though the angular errors are same each other, the larger the distance from the pivoting axis to the actual machining position is, the larger the difference between the actual machining position and the commanded machining position is. Therefore, where the distances of the actual machining positions from the pivoting axis are varied, the differences are also changed between the actual machining position and the commanded machining position. For example, it is compared a longer tool and a shorter tool where a tool supporting member supporting a tool is pivoted. There exist in the longer tool the large differences between the actual machining position and the commanded machining position even though the difference between the actual angle and the commanded angle is same. Therefore, the controller for the machine tool according to the present invention sets the allowable position error previously and controls the velocity of the pivoting axis based on the velocity control parameter so that the actual error being varied in accordance with the distances are kept within the allowable position error. Therefore, it can reduce dispersion of the machining accuracy being created by controlling the pivoting axis so that it can improve the machining accuracy.

The second aspect of the present invention provides mainly provides an allowable angular error calculating member calculating an allowable angular error of a difference between a commanded angle of the pivoting axis and an actual angle of the pivoting axis based on the allowable position error being set and the distance of the actual machining position from the pivoting axis, the velocity control parameter deciding member decides the velocity control parameter according to the allowable angular error, and the allowable position error setting member sets the allowable position error in a different value in accordance with needed accuracy of machining accuracy.

The second aspect of the present invention calculates the allowable angular error based on the allowable position error. In this condition, the velocity control parameter is decided based on the allowable angular error. In this situation, where the velocity control parameter is one of an angular velocity, an angular accelerator or an angular jerk, there exists a direct relationship between a data relating to the angular velocity of the pivoting axis and the angular velocity of the pivoting axis. Therefore, it can easily and steadily decide the velocity control parameter. And also, it can realize a needed accuracy and shorten a machining time by setting the allowable position error in accordance with the needed accuracy of the machining accuracy.

The third aspect of the present invention provides mainly that an angular velocity relating value of the pivoting axis is defined as an angular velocity, an angular accelerator or an angular jerk of the pivoting axis, the velocity control parameter is an upper limit of said angular velocity relating value of the pivoting axis, and the controlling member controls the velocity of the pivoting axis so as not to be exceeded the upper limit value by a commanded value of the angular velocity relating value of the pivoting axis or an actual value of the angular velocity relating value of the pivoting axis.

The third aspect of the present invention controls the velocity of the pivoting axis so as not to be exceeded the upper limit value by the commanded value of the angular velocity relating value of the pivoting axis or the actual value of the angular velocity relating value of the pivoting axis. Therefore, the actual difference between the commanded machining position and the actual machining position can be firmly controlled within the allowable position error being set.

The fourth aspect of the present invention provides that an angular velocity relating value of the pivoting axis is defined as an angular velocity, an angular accelerator or an angular jerk of the pivoting axis, the velocity control parameter is a reduction rate of the angular velocity relating value of the pivoting axis, and the controlling member controls the velocity of the pivoting axis by amending said commanded value of the angular velocity relating value of the pivoting axis by the reduction rate. Thereby, the actual difference between the commanded machining position and the actual machining position can be firmly controlled within the allowable position error being set.

The fifth aspect of the present invention provides that the pivoting axis is a pivoting axis around which a supporting member supporting a tool is pivoted. In general, rigidity of the tool is smaller than that of the workpiece W. Therefore, the actual error between the actual machining position and the commanded machining position is affected largely based on the distance of the actual machining position of the nose of the tool from the pivoting axis being the tool tilting axis compared to the distance of the actual machining position of the workpiece W from the pivoting axis for the workpiece W. In other words, it tends that the larger the distance of the actual machining position of the nose of the tool from the pivoting axis being the tool tilting axis is, the larger the actual error is. Therefore, the controller according to the fifth aspect controls the tool pivoting axis based on the velocity control parameter so that it can reduce the actual error between the actual machining position and the commanded machining position to improve the machining accuracy.

The sixth aspect of the present invention provides that the pivoting axis is at least one pivoting axis of a first pivoting axis around which first table mounting a workpiece is pivoted and a second pivoting axis around which the first table is further pivoted. As explained above, the rigidity of the tool is smaller than that of the workpiece W. However, there exists the workpiece having smaller rigidity. Therefore, the present invention controls one of the table pivoting axis and the further table pivoting axis so that it can reduce the difference between the actual machining position and the commanded machining position to improve the machining accuracy.

The seventh aspect of the present invention provides the five-axis simultaneous control machine tool mainly providing that a tool supporting member and a table mounting the workpiece are moved relatively along three linear axes respectively and also pivoted relatively around two pivoting axes respectively, and the controller according to one of the above-identified aspects. Therefore, the seventh aspect of the present invention can achieve same effects to that of the above-identified aspects.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

Embodiments of the controller for the machine tool and the five-axis simultaneous control machine tool controlled thereby according to the present invention will be explained hereinafter referred to Figures. One example of the machine tool according to the present invention is explained about a five-axis simultaneous control machining center having two rotational axes of A-axis and B-axis, and three linear axes of X-, Y-, Z-axis constructing a rectangular coordinate axes.

[First Embodiment of the Present Invention]

Figure 1:
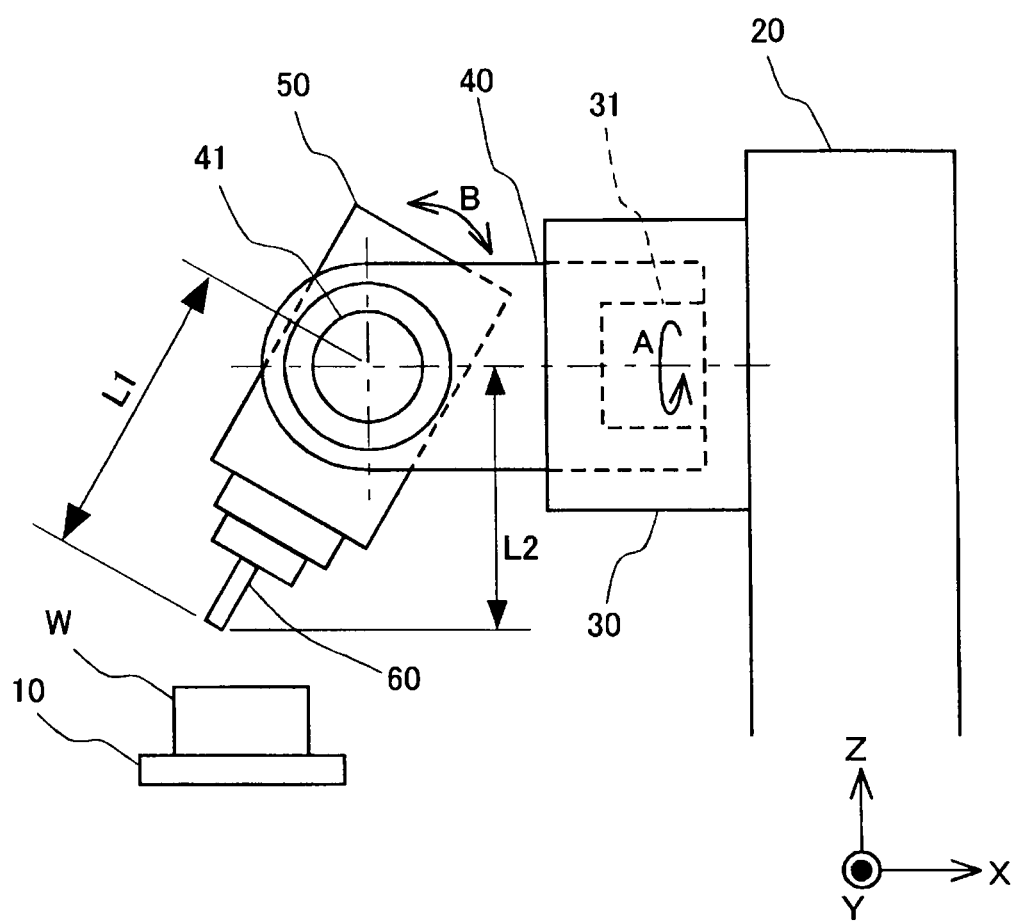
FIG. 1 is a schematic drawing showing a construction of a five-axis simultaneous control machine tool of first embodiment of the present invention.

The machining center controlled by the controller for the machine tool of the first embodiment will be explained herein referred to FIG. 1. In the five-axis simultaneous control machining center of the embodiment, a tool 60 is constructed to be pivoted around the A-axis and the B-axis and is movable relative to a workpiece W along the X-axis, the Y-axis and the Z-axis. As shown in FIG. 1, the five-axis simultaneous control machining center of the embodiment provides an un-illustrated bed, a table 10, column 20, a Z-axis movable member 30, an A-axis pivoting member 40, a spindle housing 50 and the tool 60.

The un-illustrated bed is mounted on a surface of a floor. The table 10 is mounted on the bed to be movable along an X-axis direction and a Y-axis direction relative to the bed. The workpiece W is mounted on the table 10. The column 20 is fixed on the bed.

The Z-axis movable member 30 is movable relative to the column 20 along a Z-axis direction being a vertical direction to the floor surface. The movement of the Z-axis movable member 30 along the Z-axis direction is achieved by an un-illustrated Z-axis motor fixed to the column 20. The A-axis pivoting member 40 is supported as the A-axis on the Z-axis movable member 30 to be pivoted around an axis parallel to the X-axis. The rotation of the A-axis rotational member 40 is driven by an A-axis motor 31 being fixed on the Z-axis movable member 30. The A-axis rotational member 40 corresponds to a supporting member of the present invention.

The spindle housing 50 is supported as the B-axis on an end portion of the A-axis pivoting member 40 to be pivoted around an axis parallel to the Y-axis. The spindle housing 50 also corresponds to a supporting member of the present invention. The rotation of the spindle housing 50 around the B-axis is driven by a B-axis motor fixed to the A-axis pivoting member 40. The spindle housing 50 provides a cylindrical housing being supported by the A-axis pivoting member 40, and a rotating spindle accommodated in and rotatably supported in the cylindrical housing around an axis of the spindle housing 50. The tool 60 is fixed to a nose of the rotating spindle of the spindle housing 50 to be continuously rotated with the rotation of the rotating spindle. The tool 60 is for example a ball endmill, an endmill, a drill or a tap.

Therefore, the five-axis simultaneous control machining center moves the tool 60 along the Z-axis relative to the bed and rotates the tool 60 as the A-axis rotation around the axis parallel to the X-axis and as the B-axis rotation around the axis parallel to the Y-axis for a simultaneous control, and also rotates the tool 60 continuously around the axis of the spindle housing 50 for cutting. The A-axis and the B-axis correspond to "a tool tilting axis tilting a supporting member supporting a tool" of the present invention. The machining center changes the tool 60 in accordance with a machining process.

As shown in FIG. 1, L1 is defined as a distance between a nose position of the tool 60 and the B-axis, and L2 is defined as a parallel distance between the nose position of the tool 60 and the A-axis. The L2 is variable according to the B-axis pivoting of the spindle housing 50. The nose position of the tool 60 is a real machining position when the tool 60 machines the workpiece W. Therefore, L1 is the distance of the real machining position from the B-axis and L2 is the parallel distance of the real machining position from the A-axis.

Figure 2:
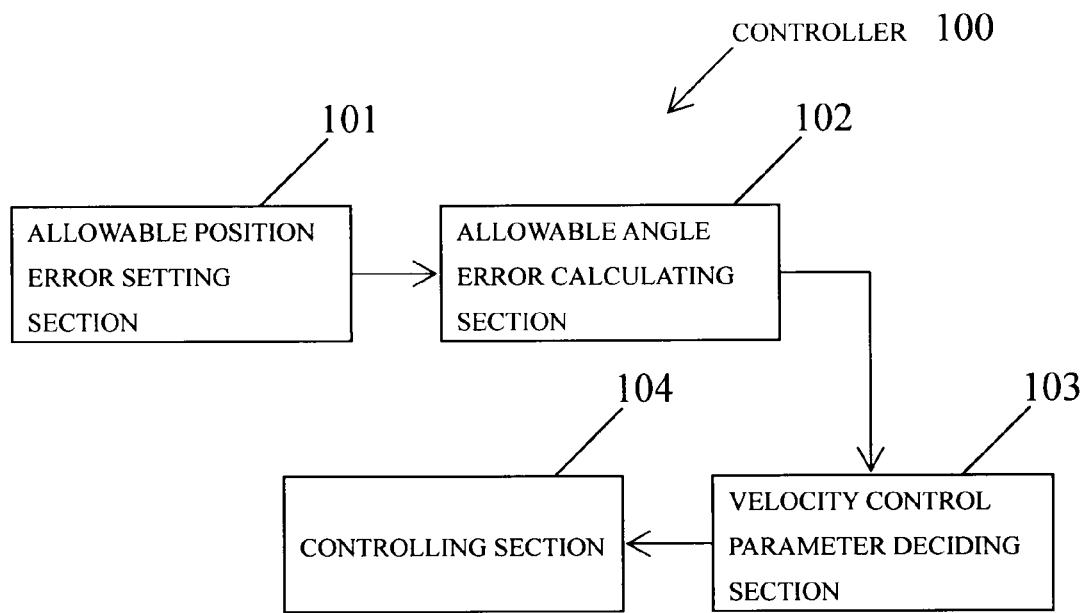
FIG. 2 is a block diagram showing a controller for the five-axis simultaneous control machine tool.

A construction of a main portion of the controller for the five axis simultaneous machining center will be explained here referred to FIG. 2. As shown in FIG. 2 a controller 100 includes an allowable position error setting section 101, an allowable angular error calculating section 102, a velocity control parameter deciding section 103 and a controlling section 104.

The allowable position error setting section 101 is to set an allowable position error Δ between a commanded machining position P1 and an actual machining position P2. The allowable position error setting section 101 corresponds to an allowable position error setting member of the present invention. A desirably ideal state is the actual machining position P2 equals to the commanded machining position P1. However it is frequently happened that the actual machining position P2 is offset from the commanded machining position P1. The difference between two positions P1 and P2 affects to a machining accuracy badly.

One of factors of the happened offset between two positions P1 and P2 follows a pivoting movement around the pivoting axis of the A-axis or the B-axis. Concretely, the pivoting member 50 is pivoted by the rotational command when it is output in concerning about the A-axis or B-axis. The actual machining position P2 is shifted slightly from the commanded machining position P1 because of a control error to the pivoting axis. Especially, the longer the distance L1 or L2 from the pivoting axis of the A-axis or the B-axis to the actual machining position P2 is, the larger its shifted amount is. And also, the actual machining position P2 is also shifted slightly from the commanded machining position P1 because of a time delay to the commanded machining position P1. Especially, the longer the distance L1 or L2 from the pivoting axis of the A-axis or the B-axis to the actual machining position P2 is, the larger its delayed amount is.

Therefore, here is set the allowable position error Δ as an allowable value between the commanded machining position P1 and the actual machining position P2. In other words, the allowable position error Δ is set so that the enough satisfied machining accuracy is obtained under the condition that the actual difference between the commanded machining position P1 and the actual machining position P2 is within the allowable position error Δ.

The allowable position error Δ is set in different value according to a demanded value of the machining accuracy. For example, the allowable position error Δ is set by the different value at each of processes of a rough machining, a middle finish machining and a final finish machining. In actual, the value of the allowable position error Δ is set by the smaller value in a sequence of processes of the rough machining, the middle finish machining and the final finish machining.

Figure 3:
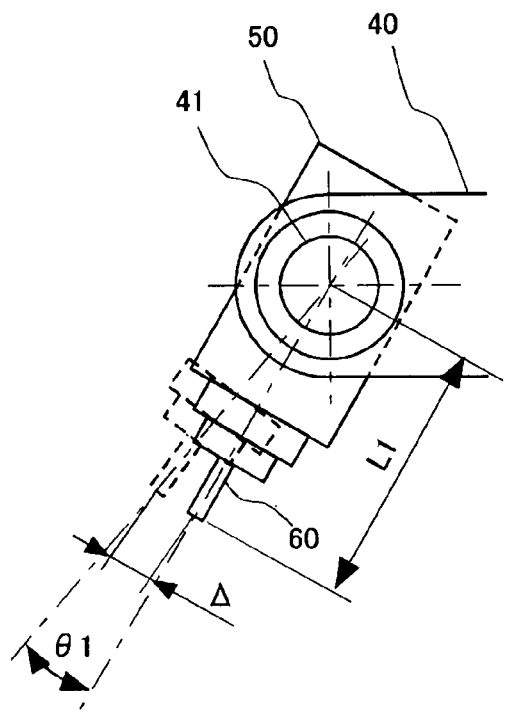
FIG. 3 is an explanatory drawing explaining an allowable position error and an allowable angular error.

Here is explained in supplemental the commanded machining position P1, the actual machining position P2 and the allowable position error Δ referred to FIG. 3. As the commanded machining position P1 is shown by a dashed line in FIG. 3, the commanded machining position P1 is the machining position output from the controller 100 based on a NC (Numerical Control) data, that is to say the commanded value of the nose position of the tool 60. As the actual machining position P2 is shown by a solid line in FIG. 3, the actual machining position P2 is the actual nose position of the tool 60. As shown in FIG. 3, it is happened to create any shift of the actual machining position P2 from the commanded machining position P1. The allowable value of the difference between the commanded machining position P1 and the actual machining position P2 is the allowable position error Δ.

The allowable angular error calculating section 102 calculates an allowable angular error θ1 based on the allowable position error Δ being set and the distance L1 of the commanded machining position P1 from the B-axis. The allowable angular error θ1 is shown in FIG. 3. The allowable angular error θ1 is a difference between a commanded angle of the B-axis and an actual angle of the B-axis. Therefore, even though the allowable position error Δ is constant, the allowable angular error θ1 is the different value according to the distance L1 in a way that the longer the distance L1 is, the smaller the allowable angular error θ1 is. The allowable angular error calculating section 102 calculates also an un-illustrated allowable angular error θ2 concerning about the A-axis in a same way to the way in the B-axis. The allowable angular errors θ1, θ2 are calculated in accordance with two next equations 1 and 2.

$$\theta 1 = \arcsin(\Delta/L1) \qquad \text{Equation 1}$$

$$\theta 2 = \arcsin(\Delta/L2) \qquad \text{Equation 2}$$

These equations is established under the condition that distances L1 and L2 of the actual machining position P2 from the pivoting axes are different according to a length of the tool 60. Therefore, The allowable angular errors θ1, θ2 are calculated in accordance with the changed tool 60.

The velocity control parameter deciding section 103 decides a velocity control parameter of the B-axis based on the allowable angular error θ1 being set and the distance L1 of the commanded machining position P1 from the B-axis. The velocity control parameter deciding section 103 decides also a velocity control parameter of the A-axis in the same way to the B-axis.

The velocity control parameter is a control parameter relating to an angular velocity of the A-axis or the B-axis. The control parameter corresponds to an angular velocity relating value. The velocity control parameter is an upper limit value of the angular velocity, an angular acceleration or an angular jerk (the rate of change of acceleration) of the A-axis or the B-axis.

Figure 4:
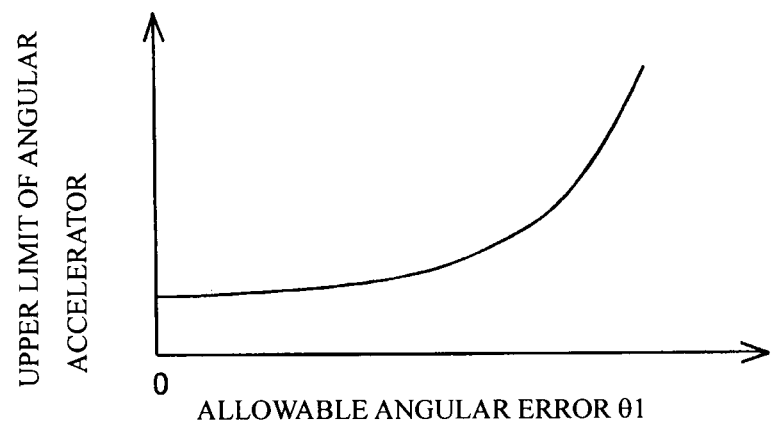
FIG. 4 is a chart showing relationship of an upper limit of angular accelerator relative to the allowable angular error.

The upper limit value of the angular acceleration as the velocity control parameter will be explained here referred to FIG. 4. FIG. 4 shows the upper limit value of the angular acceleration of the B-axis versus the allowable angular error θ1 relating to the B-axis. As shown in FIG. 4, there is a relationship that the bigger the allowable angular error θ1 is, the bigger the upper limit value of the angular acceleration is. The upper limit value of the angular acceleration is increased exponentially relative to the allowable angular error θ1. In other words of this relationship, it is set in a way that the longer the distance L1 from the B-axis to the actual machining position P2 is, the smaller the upper limit value of the angular acceleration of the B-axis is.

Where the angular velocity relating value is determined in this embodiment, at first it calculates the allowable angular errors θ1 and θ2 based on the allowable position error Δ. And then, it sets as the angular velocity relating value the upper limit value of the angular velocity, the angular acceleration or the angular jerk of the A-axis or the B-axis based on the allowable angular errors θ1 or θ2. It is easy to set the relationship between the allowable angular errors θ1 or θ2 and the angular velocity relating value of the A-axis or the B-axis. Therefore, the angular velocity relating value to the allowable angular errors θ1 or θ2 is easily and firmly determined as shown in FIG. 4.

The controlling section 104 controls the velocities of the A-axis and the B-axis based on the velocity control parameter. The controlling section 104 also controls the velocities of the linear axes of X-, Y-, Z-axis following the A-axis and the B-axis being controlled. In detail, the controlling section 104 sets the commanded value of the angular accelerations of the A-axis and the B-axis so as not to be exceeded the upper limit value of the angular acceleration of the A-axis or the B-axis by the commanded value of the angular acceleration of the A-axis or the B-axis. The controlling section 104 also sets the commanded value of the angular velocity and the angular jerk of the A-axis and the B-axis so as not to be exceeded the upper limit value of the angular velocity or the angular jerk of the A-axis or the B-axis by the commanded value of the angular velocity or the angular jerk of the A-axis or the B-axis.

As explained above, the controller for the machine tool of the present invention decides the upper limits of the angular acceleration etc., as the velocity control parameter, based on "the allowable position error Δ" and "the distances L1 and L2 from the A-axis and the B-axis to the actual machining position P2". In this case there exist the angular errors of the A-axis and the B-axis, that is to say the distances between the commanded angle and the actual angle, in controlling the A-axis and the B-axis. Even though the angular errors are same each other, the larger the distances L1 and L2 from the A-axis and the B-axis to the actual machining position P2 are, the larger the difference between the actual machining position P2 and the commanded machining position P1 is.

Therefore, where the distances are varied, the differences are also changed between the actual machining position P2 and the commanded machining position P1. In details, if a predetermined allowable value were set for the angular error and it controls the rotating axis so as to keep the error within the allowable value, the error between the actual machining position P2 and the commanded machining position P1 should be variable in accordance with the distances L1, L2.

Therefore, the controller for the machine tool according to the present invention sets the allowable position error Δ previously and controls the velocities of the A-axis and the B-axis based on the velocity control parameter so that the actual error being varied in accordance with the distances L1, L2 are kept within the allowable position error Δ. Thereby, the actual error between the actual machining position P2 and the commanded machining position P1 can be kept within the allowable position error Δ by controlling the A-axis and the B-axis. Therefore, it can reduce dispersion of the machining accuracy being created by controlling the A-axis and the B-axis so that it can improve the machining accuracy.

The controller for the machine tool according to the present invention sets the allowable position error Δ respectively for the processes of the rough machining, the middle finish machining and the final finish machining. In general, it needs for a controller to reduce the machining accuracy worse in the process of the rough machining than in the process of the finish machining and also to reduce machining time. On the other hand, it needs for the controller to machine in the best machining accuracy and to reduce the machining time as much as possible in the processes of the finish machining. As a result, there are different needs in each of these three machining processes. Therefore, a suitable machining process for each machining process can be obtained by setting the allowable position error Δ suitable for the need of each of the machining processes.

The five-axis simultaneous control machine tool of the first embodiment of the present invention consists of the tool 60 being rotated around the A-axis and the B-axis. In general, rigidity of the tool 60 is smaller than that of the workpiece W. Therefore, the actual error between the actual machining position P2 and the commanded machining position P1 is affected largely based on the distances L1 and L2 of the actual machining position P2 of the nose of the tool 60 from the A-axis and the B-axis being the tool tilting axis compared to the distances L1 and L2 of the actual machining position P2 of the workpiece W from the rotating axis for the workpiece W. In other words, it tends that the larger the distances L1 and L2 of the actual machining position P2 of the nose of the tool 60 from the A-axis and the B-axis being the tool tilting axis are, the larger the actual error is. Therefore, the controller for the five-axis simultaneous control machine tool of the present invention controls the tool tilting axes of the A-axis and the B-axis based on the velocity control parameter so that it can reduce the actual error between the actual machining position P2 and the commanded machining position P1 to improve the machining accuracy.

"Second Embodiment of the Present Invention"

The controller for the machine tool and the five-axis simultaneous control machine tool controlled thereby of the second embodiment of the present invention will be explained referred to FIG. 5. The second embodiment has the velocity control parameter deciding section 103 and the controlling section 104 being different from these of the first embodiment and the remaining members of the second embodiment are same to these of the first embodiment. Therefore, only differences are explained hereinafter.

The velocity control parameters in the velocity control parameter deciding section 103 of the second embodiment are reduction rate of the angular velocity, reduction rate of the angular accelerator or reduction rate of the angular jerk of the A-axis or the B-axis. For example, where the commanded value of the angular velocity of the A-axis is "V" and the reduction rate of the angular velocity of the A-axis is decided as 30%, the commanded value of the angular velocity of the A-axis after amending is "V*0.7" (V multiplies 0.7). Therefore, the reduction rate is the meaning of the reducing rate relative to the commanded value being as a reference.

Figure 5:
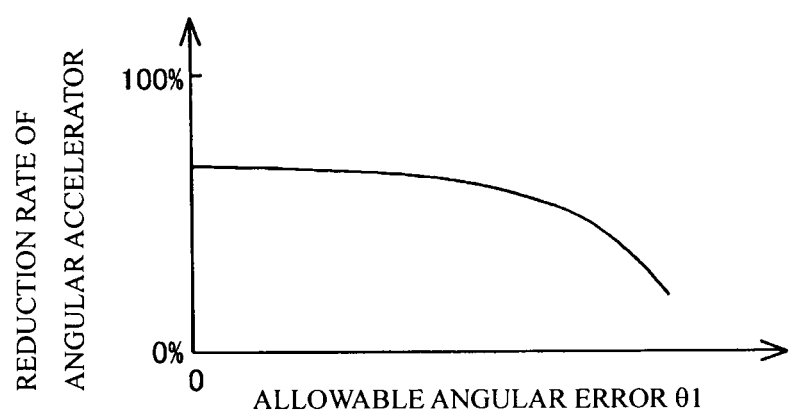
FIG. 5 is a chart showing relationship of a reduction rate of the angular accelerator relative to the allowable angular error according to second embodiment of the present invention.

For example as shown in FIG. 5, it is set the reduction rate of the angular accelerator relative to the allowable position error Δ. FIG. 5 shows it is set so that the longer the distance L1 from the B-axis to the actual machining position P2 is, the larger the reduction rate of the angular accelerator of the B-axis is.

The value being amended by the corresponding reduction rate relative to each of the commanded value of the angular velocity, the angular accelerator and the angular jerk is set by the controller 104 as the commanded value after amending. And the controller 104 controls the velocities of the A-axis and the B-axis based on the amended commanded value.

In this case, the second embodiment of the present invention can control the actual error between the commanded machining position P1 and the actual machining position P2 within the allowable position error Δ being set.

"Third Embodiment of the Present Invention"

Figure 6:
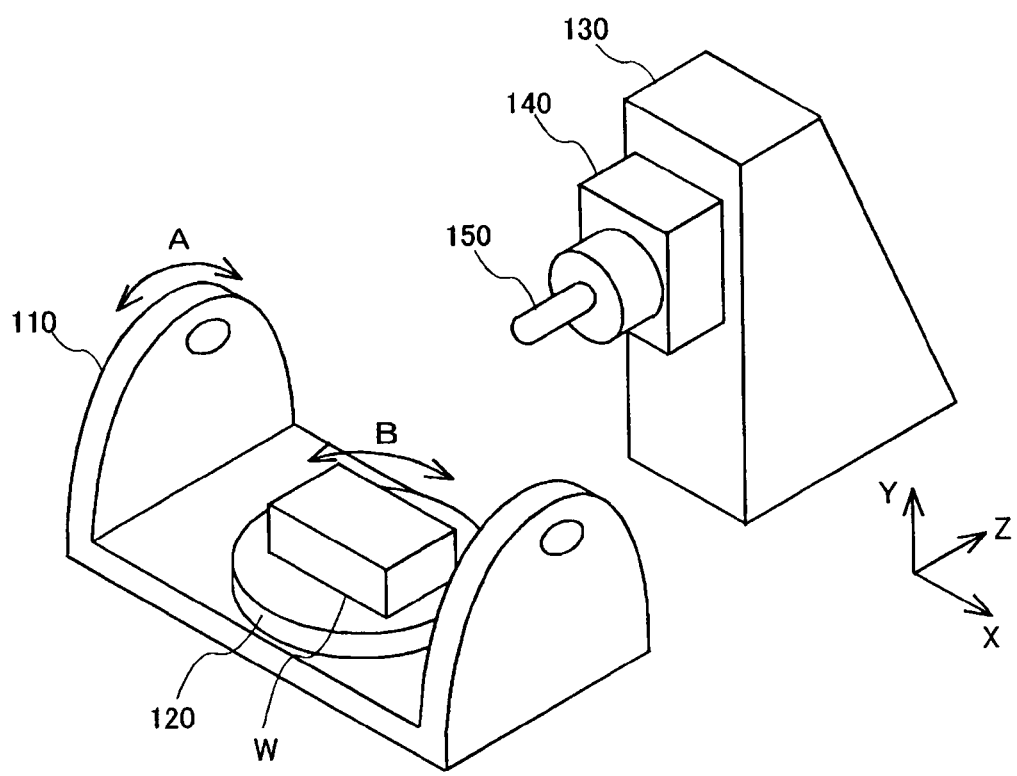
FIG. 6 is a schematic drawing showing a construction of a five-axis simultaneous control machine tool of third embodiment of the present invention.

The controller for the machine tool and the five-axis simultaneous control machine tool controlled thereby of the third embodiment according to the present invention will be described for controlling the five-axis simultaneous control machining center referring to FIG. 6 to FIG. 8. The five-axis simultaneous control machining center of the third embodiment has the workpiece being pivoted around the A-axis and the B-axis. As shown in FIG. 6, the five-axis simultaneous control machining center of the third embodiment includes an un-illustrated bed, a tilting table 110, a rotating table 120, a column 130, a spindle housing 140 and a tool 150.

The tilting table 110 is constructed as a trunnion shape and supported rotatably around each of locking points at both ends of the trunnion within 90 degrees around the A-axis. An A-axis motor drives the pivoting of the tilting table 110 around the A-axis.

The rotating table 120 is supported rotatably on the tilting table 110 around the B-axis of a normal axis of the tilting table 110. The workpiece W is mounted on the rotating table 120.

The column 130 is mounted on the un-illustrated bed so as to be movable relative to the un-illustrated bed along the X-axis and Y-axis directions. The spindle housing 140 is mounted to be movable relative to the column 130 along the Y-axis perpendicular to the floor. And the spindle housing 140 includes a hollow housing, and a rotating spindle accommodated in the hollow housing to be rotatable around an axis of the spindle housing 140. Therefore, the rotating spindle is continuously rotated around a C-axis relative to the housing. The tool 150 is attached on a nose of the rotating spindle of the spindle housing 140 in order to be rotated with the rotating spindle.

The five-axis simultaneous control machining center controlled by the controller for the machine tool includes the workpiece pivoted around the A-axis and the B-axis, and the tool 150 moved along the X-axis, the Y-axis and the Z-axis relative to the bed. The pivoting axis of the B-axis of the rotating table 120 in the third embodiment corresponds to "first pivoting axis of first table on which said table mounting said workpiece is pivoted" in the present invention and the pivoting axis of the A-axis of the tilting table 110 is corresponding to "second pivoting axis of second table pivoting the first table" in the present invention.

Figure 7:
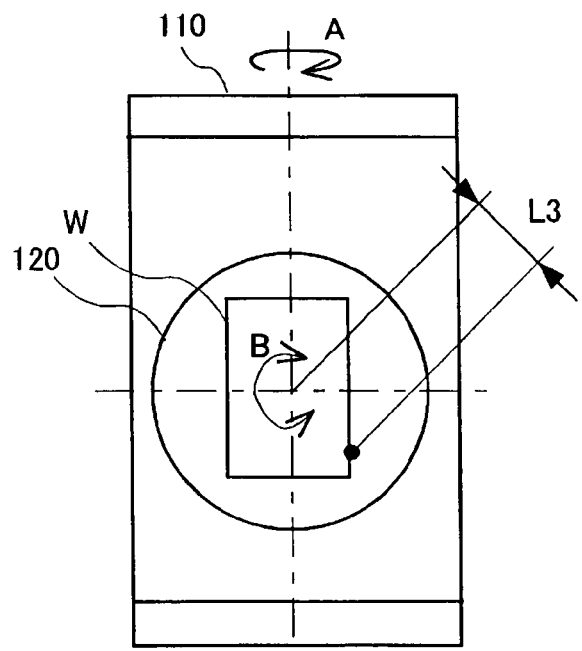
FIG. 7 is an explanatory drawing explaining an allowable position error relative to a B-axis.
Figure 8:
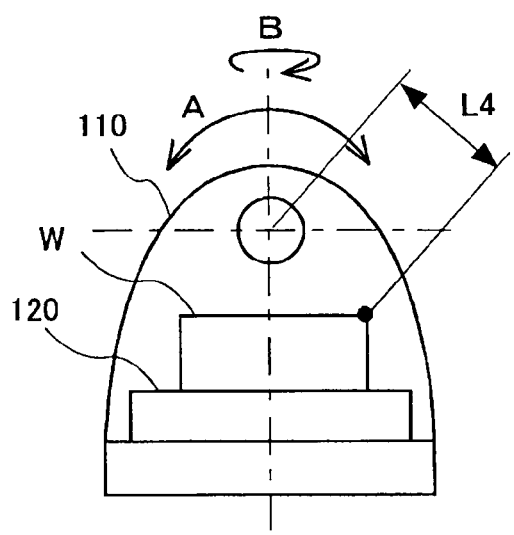
FIG. 8 is an explanatory drawing explaining an allowable position error relative to an A-axis.

As shown in FIG. 7, a distance L3 is defined as the distance of the machining position at certain time from the B-axis. A distance L4 is defined as the distance of the machining position at certain time from the A-axis as shown in FIG. 8. In this case, the commanded value of the machining position of the workpiece W at certain time is corresponding to the commanded machining position in the first embodiment. The actual machining position in the first embodiment is corresponded to the actual machining position of the tool 150 on the workpiece W in the third embodiment.

There is a possibility of the position displacement between the commanded machining position and the actual machining position in same situation to the first embodiment. Therefore, the third embodiment can make the same result by replacing each of the distances L1 and L2 in the first embodiment to each of the distances L3 and L4 in the third embodiment.

While the invention has been described in detail with reference to the preferred embodiment, it will be apparent to those skilled in the art that the invention is not limited to the present embodiment, and that the invention may be realized in various other embodiments within the scope of the claims.

For example, while the tool 60 is pivoted around the A-axis and the B-axis in the first embodiment and the workpiece W is pivoted around the A-axis and the B-axis in the third embodiment, however it may be constructed that each of the tool 60 and the workpiece W is rotated around the A-axis or the B-axis to make the same effect.

While the rotating table 120 mounting the workpiece W is pivoted around the B-axis and the tilting table 110 mounting the rotating table 120 is pivoted around the A-axis, however it may be constructed that the workpiece W is mounted on the tilting table pivoted around the A-axis and the tilting table is mounted on the rotating table pivoted around the B-axis. In this case, the pivoting axis of the A-axis of the tilting table 110 in the third embodiment is corresponding to "first pivoting axis of first table on which said table mounting said workpiece is pivoted" in the present invention and the pivoting axis of the B-axis of the rotating table 120 is corresponding to "second pivoting axis of second table pivoting the first table" in the present invention. There is same effect in this situation to that in the previously explained embodiments.

While the controller 104 sets the commanded value of the angular acceleration, the angular velocity or the angular jerk of the A-axis or the B-axis so as not to be exceeded the upper limit value of the angular acceleration, the angular velocity or the angular jerk of the A-axis and the B-axis by the commanded value of the angular acceleration, the angular velocity or the angular jerk of the A-axis or the B-axis, however, it may be constructed that the controller 104 sets the commanded value of the angular acceleration, the angular velocity or the angular jerk of the A-axis or the B-axis so as not to be exceeded the upper limit value of the angular acceleration, the angular velocity or the angular jerk of the A-axis and the B-axis by the actual value of the angular acceleration, the angular velocity or the angular jerk of the A-axis or the B-axis.

While the controller 104 sets the commanded value of the angular acceleration, the angular velocity or the angular jerk of the A-axis or the B-axis so as not to be exceeded the upper limit value of the angular acceleration, the angular velocity or the angular jerk of the A-axis and the B-axis by the commanded value of the angular acceleration, the angular velocity or the angular jerk of the A-axis or the B-axis, however, it may be constructed that the controller 104 sets the commanded value of the angular acceleration, the angular velocity or the angular jerk of the A-axis or the B-axis so as not to be exceeded the upper limit value of one of the angular acceleration, the angular velocity or the angular jerk of the A-axis and the B-axis by the commanded value of corresponding one of the angular acceleration, the angular velocity or the angular jerk of the A-axis or the B-axis.

What is claimed is:

1. A controller for a machine tool that moves relative to a workpiece along three linear axes of x-axis, y-axis and z-axis, and also pivots relatively around a first pivoting axis and a second pivoting axis, wherein the first pivoting axis is a rotating axis parallel to the y-axis, and the second pivoting axis is a rotating axis parallel to the x-axis, said controller for said machine tool comprising;

an allowable position error setting member setting an allowable position error between a commanded machining position and an actual machining position;

a first velocity control parameter deciding member deciding a first velocity control parameter of said first pivoting axis in accordance with said allowable position error and a first distance of a nose position of a tool from said first pivoting axis, wherein the first distance varies depending on an angle of the first rotating axis, and the nose position of the tool being the actual machining position when the tool touches the workpiece, and wherein the nose position is defined in terms of said x-axis, y-axis and z-axis;

a second velocity control parameter deciding member deciding a second velocity control parameter of said second pivoting axis in accordance with said allowable position error and a second distance of the nose position from said second pivoting axis;

wherein said second distance is a parallel distance between the second pivoting axis and the x-axis of the nose position, and varies depending on the surface of the workpiece; and a controlling member controlling a velocity of said first and second pivoting axes based on said first and second velocity control parameters;

wherein said controller for said machine tool further comprising an allowable angular error calculating member calculating a first allowable angular error of a difference between a commanded angle of said first pivoting axis and an actual angle of said first pivoting axis based on said allowable position error being set and said first distance; and said first velocity control parameter deciding member decides said first velocity control parameter according to said first allowable angular error.

2. A controller for a machine tool according to claim 1, wherein said allowable position error setting member sets said allowable position error in a different value in accordance with needed accuracy of machining accuracy.

3. A controller for a machine tool according to claim 2, wherein said allowable position error setting member sets said allowable position error in a different value in accordance with processes of a rough machining and a finish machining respectively.

4. A controller for a machine tool according to claim 3, wherein;
a first angular velocity relating value of said first pivoting axis is defined as an angular velocity, an angular accelerator or an angular jerk of said first pivoting axis;
said velocity control parameter is an upper limit of said first angular velocity relating value of said first pivoting axis; and
said controlling member controls said velocity of said first pivoting axis so to not exceed said upper limit value by a commanded value of said first angular velocity relating value of said first pivoting axis or an actual value of said first angular velocity relating value of said first pivoting axis.

5. A controller for a machine tool according to claim 4, wherein;
said velocity control parameter deciding member sets in a way that the longer said first distance of said nose position of the tool from said first pivoting axis is, the smaller said upper limit of said first angular velocity relating value is.

6. A controller for a machine tool according to claim 5, wherein said first pivoting axis is a pivoting axis around which a supporting member supporting a tool is pivoted.

7. A controller for a machine tool according to claim 3, wherein;
a first angular velocity relating value of said first pivoting axis is defined as an angular velocity, an angular accelerator or an angular jerk of said first pivoting axis;
said velocity control parameter is a reduction rate of said first angular velocity relating value of said first pivoting axis; and said controlling member controls said velocity of said first pivoting axis by amending a commanded value of said first angular velocity relating value of said first pivoting axis by said reduction rate.

8. A controller for a machine tool according to claim 7, wherein;
said velocity control parameter deciding member sets in a way that the longer said first distance of said nose position of the tool from said first pivoting axis is, the larger said reduction rate of said first angular velocity relating value is.

9. A controller for a machine tool according to claim 8, wherein said first pivoting axis is a pivoting axis around which a supporting member supporting a tool is pivoted.

10. A controller for a machine tool according to claim 1, wherein;
said allowable angular error calculating member further calculates a second allowable angular error of a difference between a commanded angle of said second pivoting axis and an actual angle of said second pivoting axis based on said allowable position error being set and said second distance of said nose position of the tool from said second pivoting axis; and
said second velocity control parameter deciding member decides said second velocity control parameter according to said second allowable angular error.

11. A controller for a machine tool according to claim 1, wherein said first pivoting axis is a pivoting axis around which a supporting member supporting the tool is pivoted, and said second pivoting axis is a pivoting axis around which a supporting member supporting the tool is pivoted.

12. A five-axis simultaneous control machine tool that moves relative to a workpiece along three linear axes of x-axis, y-axis and z-axis, and also pivots relatively around a first pivoting axis and a second pivoting axis, wherein the first pivoting axis is a rotating axis parallel to the y-axis, and the second pivoting axis is a rotating axis parallel to the x-axis,
the machine tool controlled by a controller, the machine tool, comprising; a base;
a tool supporting member mounted on the base to support a tool; a table mounted on said base to support a workpiece; said tool supporting member and said table are moved relatively along the three linear axes respectively and also pivoted relatively around the first pivoting axis and the second pivoting axis; and said controller for said five-axis simultaneous control machine tool controlling said tool supporting member and said table, said controller comprising;
an allowable position error setting member setting an allowable position error between a commanded machining position and an actual machining position;
a first velocity control parameter deciding member deciding a velocity control parameter of said first pivoting axis in accordance with said allowable position error and a first distance of a nose position of a tool from said first pivoting axis,
wherein the first distance varies depending on an angle of the first rotating axis, and
the nose position of the tool being the actual machining position when the tool touches the workpiece,
and wherein the nose position is defined in terms of said x-axis, y-axis and z-axis;
a second velocity control parameter deciding member deciding a second velocity control parameter of said second pivoting axis in accordance with said allowable position error and a second distance of the nose position from said second pivoting axis;

wherein said second distance is a parallel distance between the second pivoting axis and the x-axis of the nose position, and varies depending on the surface of the workpiece; and an allowable angular error calculating member calculating an allowable angular error between a commanded angle of said first pivoting axis and an actual angle of said first pivoting axis based on said allowable position error being set and said first distance;

said first velocity control parameter deciding member decides said first velocity control parameter according to said allowable angular error;

said allowable position error setting member sets said allowable position error in a different value in accordance with needed accuracy of machining accuracy; and a controlling member controlling a velocity of said first and second pivoting axes based on said first and second velocity control parameters.

13. A five-axis simultaneous control machine tool controlled by a controller for a machine tool according to claim 12, wherein;

a first angular velocity relating value of said first pivoting axis is defined as an angular velocity, an angular accelerator or an angular jerk of said first pivoting axis;

said first velocity control parameter is an upper limit of said first angular velocity relating value of said first pivoting axis; and said controlling member controls said velocity of said first pivoting axis to not exceed said upper limit value by a commanded value of said first angular velocity relating value of said first pivoting axis or an actual value of said first angular velocity relating value of said first pivoting axis.

14. A five-axis simultaneous control machine tool controlled by a controller for a machine tool according to claim 13, wherein;

said velocity control parameter deciding member sets in a way that the longer said first distance of said nose position of the tool from said first pivoting axis is, the smaller said upper limit of said first angular velocity relating value is.

15. A five-axis simultaneous control machine tool controlled by a controller for a machine tool according to claim 12, wherein;

a first angular velocity relating value of said first pivoting axis is defined as an angular velocity, an angular accelerator or an angular jerk of said first pivoting axis;

said first velocity control parameter is a reduction rate of said first angular velocity relating value of said first pivoting axis; and said controlling member controls said velocity of said first pivoting axis by amending a commanded value of said first angular velocity relating value of said first pivoting axis by said reduction rate.

16. A five-axis simultaneous control machine tool controlled by a controller for a machine tool according to claim 15, wherein;

said first velocity control parameter deciding member sets in a way that the longer said first distance of said actual machining position from said first pivoting axis is, the larger said reduction rate of said first angular velocity relating value is.

17. A five-axis simultaneous control machine tool controlled by a controller for a machine tool according to claim 14, wherein said tool supporting member is pivoted against said base relative to said table supporting said workpiece.

18. A five-axis simultaneous control machine tool controlled by a controller for a machine tool according to claim 14, wherein said table supporting said workpiece is pivoted against said base relative to said tool supporting member.

19. A five-axis simultaneous control machine tool controlled by a controller for a machine tool according to claim 16, wherein said tool supporting member is pivoted against said base relative to said table supporting said workpiece.

20. A five-axis simultaneous control machine tool controlled by a controller for a machine tool according to claim 16, wherein said table supporting said workpiece is pivoted against said base relative to said tool supporting member.

* * * * *